(12) United States Patent
Samadani et al.

(10) Patent No.: US 7,868,950 B1
(45) Date of Patent: Jan. 11, 2011

(54) REDUCING NOISE AND ARTIFACTS IN AN IMAGE

(75) Inventors: Ramin Samadani, Palo Alto, CA (US); Suk Hwan Lim, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1304 days.

(21) Appl. No.: 11/405,065

(22) Filed: Apr. 17, 2006

(51) Int. Cl.
H04N 5/21 (2006.01)
H04N 1/58 (2006.01)

(52) U.S. Cl. .................. 348/609; 348/607; 348/666; 348/701; 348/631; 348/627

(58) Field of Classification Search ............. 348/609, 348/607, 621, 630, 631, 666, 701, 708, 627, 348/253; 382/275, 268, 235; 375/240.27, 375/240.25
See application file for complete search history.

(56) References Cited

U.S. PATENT DOCUMENTS

| | | | |
|---|---|---|---|
| 6,856,704 B1 * | 2/2005 | Gallagher et al. | 382/263 |
| 7,076,113 B2 * | 7/2006 | Le Dinh | 382/261 |
| 2003/0215153 A1 * | 11/2003 | Gindele et al. | 382/254 |
| 2005/0078872 A1 | 4/2005 | Samadani et al. | |
| 2005/0244061 A1 | 11/2005 | Shaked et al. | |
| 2005/0244075 A1 | 11/2005 | Shaked et al. | |

OTHER PUBLICATIONS

Netravali, A., "Noise Removal from Chrominance Components of a Color Television Signal", IEEE Transactions on Communications, vol. Com-26, No. 8, Aug. 1978.
Samadani, R., "Characterizing and Estimating Block DCT Image Compression Quantization Parameters", HP Laboratories Palo Alto, HPL-2005-190, Oct. 20, 2005 Internal Accession Date.
Samadani, R. et al., "Deringing and Deblocking DCT Compression Artifacts with Efficient Shifted Transforms", HP Labs Palo Alto, Imaging Technologies Dept., downloaded Apr. 17, 2006.
Tomasi, C., et al., "Bilateral Filtering for Gray and Color Images", downloaded Apr. 17, 2006.

* cited by examiner

Primary Examiner—David L Ometz
Assistant Examiner—Jean W Désir (57) ABSTRACT

In a method of processing an input image, compression parameters of the input image are determined and luminance artifacts in the input image are reduced to obtain an improved luminance component of the input image, where the determined compression parameters guide the luminance artifact reduction. In addition, a chrominance noise and chrominance artifact level of the input image is estimated and a spatially-correlated chrominance noise and chrominance artifact of the input image is reduced with the improved luminance component, where the estimated chrominance noise and chrominance artifact level guide the spatially-correlated chrominance noise and chrominance artifact reduction to obtain an improved chrominance component of the input image. Moreover, an output image having the improved luminance component and the improved chrominance component is outputted.

20 Claims, 5 Drawing Sheets

REDUCING NOISE AND ARTIFACTS IN AN IMAGE

BACKGROUND

Traditional digital images from low resolution sources, such as, cellular telephones, personal digital assistants and web sites typically have both compression artifacts and image noise. The compression artifacts often produce blocks and ringing, and the image noise often results in correlated luminance and chrominance errors. Images that contain both compression artifacts together with image noise are much harder to enhance than images containing only a single type of degradation. This is because estimating image noise levels is difficult for low-resolution images, and erroneous noise estimates in the luminance channel often result in insufficient luminance noise reduction or overly blurred images, and artifact reduction alone does not sufficiently reduce the strong chrominance noise (which is not necessarily due to compression) that is typically observed with these images.

In comparing the lower resolution images obtained from the above-described low resolution sources with higher resolution images, the lower resolution images typically have higher noise due to low quality CMOS image sensors. In addition, the lower resolution capture devices typically have lower cost, and hence lower quality optics, and often have a relatively high compression ratio. As such, the lower resolution images often have a relatively large number of visually objectionable artifacts, especially for images obtained in low light situations, which are typically more clearly visible when the images are enlarged.

Conventional techniques for improving the lower resolution images have included aggressive linear filtering. However, conventional aggressive linear filtering techniques often resulted in the introduction of visible saturation variations or excessive de-saturation of the image. Other challenges to conventional image enhancement techniques for low resolution images include the fact that many artifact reduction methods do not work reasonably well for chrominance channels because chrominance noise and artifact are not due solely to compression artifacts, but due to other image noise sources, and they are found to be extremely high for many of the low-resolution images. In addition, it is often relatively difficult to estimate the amount of noise and hence the denoising parameters for relatively small images. Moreover, estimating chrominance channel compression parameters is typically much more difficult than the luminance channel because of unknown subsampling factors and higher compression settings for chrominance.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring to embodiments thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

An input image may include one or both of compression artifacts and image noise. As described in greater detail herein below, the input image may be processed in various respects to substantially reduce or eliminate both of the compression artifacts and the image noise. In one regard, the input image may be processed such that the artifacts are reduced in the luminance channel and the image noise and artifacts are reduced in the chrominance channel. In addition, the artifact reduced luminance channel may operate as guidance for multi-resolution luminance-guided filtering of the chrominance channel.

The techniques disclosed herein are operable to reduce relatively high noise and artifacts in the chrominance channels by using the artifact reduced luminance channel as guidance for multi-resolution filtering in the chrominance channel. Thus, the chrominance noise and artifact may be reduced in a relatively aggressive manner substantially without blurring the image and may rely on relatively less accurate noise estimation techniques. The techniques disclosed herein may also be relatively robust to the errors in the noise variance estimation since these estimates may only be used to reduce chrominance noise and chrominance artifacts, where errors in the estimates are not as visible as they would be in the luminance channel. In addition, these techniques may be relatively robust to the estimation of compression parameters since these estimates may only be required for the luminance component artifact reduction.

Generally speaking, the compression artifact reduction parameters required in the luminance channel are fairly robust. In certain examples, the parameters are directly derived from compression parameters directly available from digital image files. Even in cases where the compression parameters require estimation, the parameters are simpler to estimate than chrominance compression parameters because there is no subsampling in the luminance components, and the quantization factors are typically smaller, making their estimation easier.

Also disclosed herein is an architecture that concurrently reduces compression artifacts and image noise. The combination is performed in a way that alleviates weaknesses of singularly applying either compression artifact reduction or image noise reduction. According to an example, the blocks for compression artifact reduction and image noise reduction may: 1) reduce compression artifacts effectively by processing only the luminance channel and 2) reduce the high noise and artifacts in the chrominance channel by using the artifact reduced luminance channel as guidance for multi-resolution noise filtering (in other words, the chrominance noise and chrominance artifact reduction may be more aggressive without blurring the image and may rely less on accurate noise estimation). In addition, the techniques disclosed herein are more robust to errors in the noise variance estimation since these estimates are used only to reduce chrominance noise and chrominance artifacts and are more robust to estimation of compression parameters (required by some architectures) since they are only needed for the luminance component as compared with known image enhancement techniques.

Figure 1:
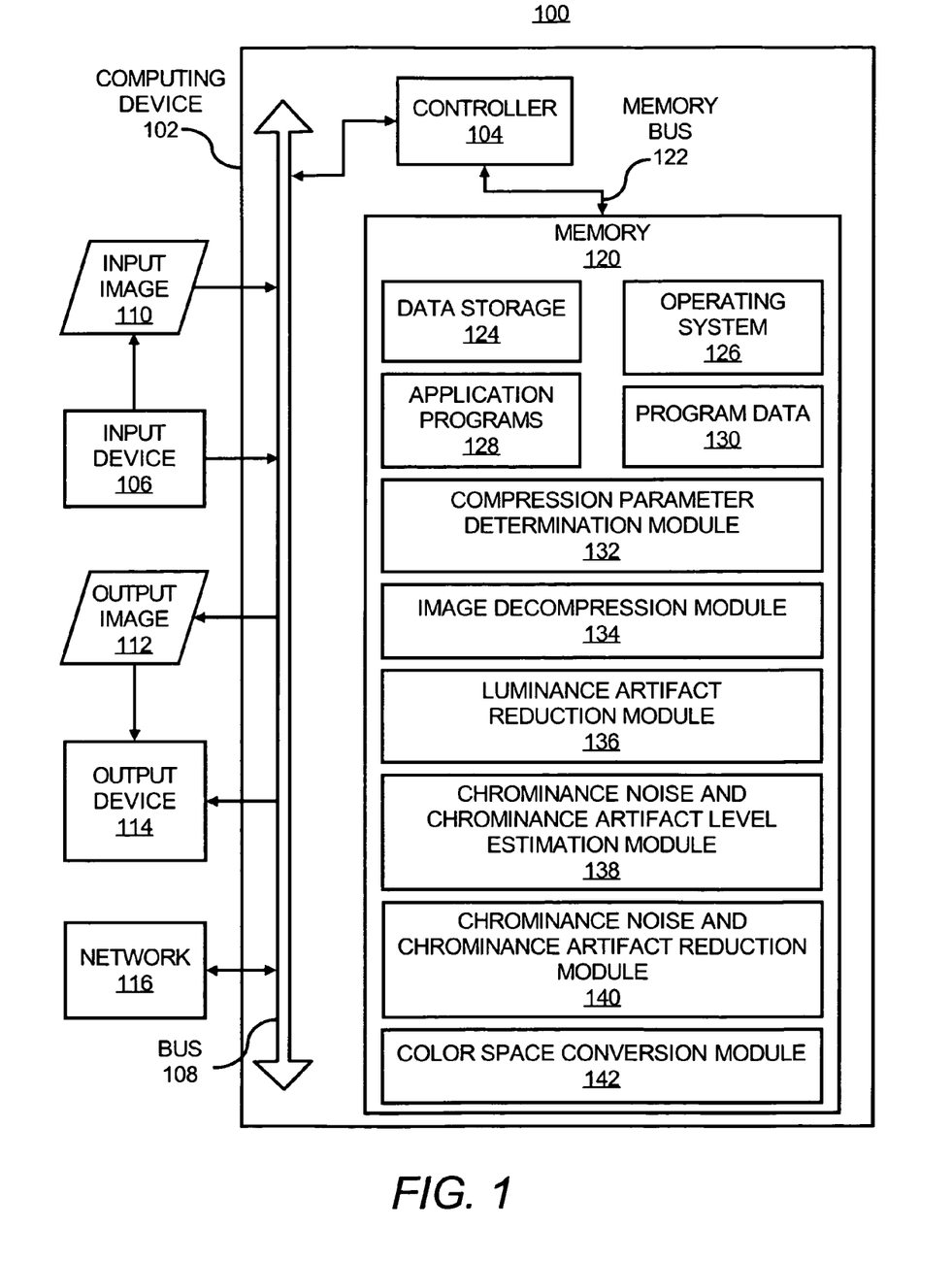
FIG. 1 shows a block diagram of an image processing system, according to an embodiment of the invention.

With reference first, however, to FIG. 1, there is shown a block diagram of an image processing system 102 configured to process an input image, according to an example. It should be understood that the following description of the image processing system 100 is but one manner of a variety of different manners in which such an image processing system 100 may be configured and operated. In addition, it should be understood that the image processing system 100 may include additional components and that some of the components described may be removed and/or modified without departing from a scope of the image processing system 100. Moreover, it should be understood that some of the components described may not be implemented for each of the various image processing techniques disclosed herein.

Generally speaking, the image processing system 100 may be implemented to perform the various image processing techniques disclosed herein. As such, for instance, the image processing system 102 may comprise a platform through which the disclosed various image processing techniques may be performed to substantially reduce or eliminate both of the compression artifacts and the image noise in an input image.

The image processing system 100 is depicted as including a computing device 102, having a controller 104 configured to perform various image processing functions described herein. In one regard, the controller 104 may comprise a microprocessor, a micro-controller, an application specific integrated circuit (ASIC), and the like. The controller 104 may also be configured to perform other processing tasks, such as, the performance of other processing tasks of the computing device.

The controller 202 is depicted as being configured to receive information from an input device 106, such as, a keyboard, a touchpad, a mouse, a pen, a disk drive, an external memory, etc. As shown, inputs from the input device 106 may be communicated to the controller 104 through a bus 108 of the computing device 102, to which the input device 106 may be connected in any reasonably suitable known manner. A user may, for instance, use the input device 106 to input an image 110, or data pertaining to the input image 110, to be processed into the computing device 102. In addition, the controller 104 may store the information received through the input device 106, such as, an input image 110, in a memory 120. For instance, the input image 110 may be transferred into the memory 120 through a memory bus 122 and may be stored in a data storage 124 of the memory 120. In addition, the input image 110 may comprise a relatively low resolution image, such as those obtainable from cellular telephones, to a relatively high resolution image, such as those obtainable from digital cameras.

As described in greater detail herein below, the controller 104 may process the input image 110 to obtain an output image 112. The controller 104 may output the output image 112 through an output device 114 such as, a monitor, a printer, a disk drive, an external memory, etc., which may be connected to the bus 108 in an reasonably suitable known manner. In addition, or alternatively, the information communicated through the output device 114 may be communicated over a network 116, such that the information may be communicated to, for instance, another computing device (not shown). In this regard, the network 116 may comprise a local area network, the Internet, and the like. In addition, the controller 104 may also receive the input image 110 through the network 116.

The memory 120 may generally be configured to provide storage of software, algorithms, and the like, that provide the functionality of the controller 104. By way of example, the memory 120 may store an operating system 126, application programs 128, program data 130, and the like. In this regard, the memory 120 may be implemented as a combination of volatile and non-volatile memory, such as DRAM, EEPROM, MRAM, flash memory, and the like. In addition, or alternatively, the memory 120 may comprise a device configured to read from and write to a removable media, such as, a floppy disk, a CD-ROM, a DVD-ROM, or other optical or magnetic media.

The memory 120 is also depicted as storing a compression parameter determination module 132, an image decompression module 134, a luminance artifact reduction module 136, a chrominance noise and chrominance artifact level estimation module 138, a chrominance noise and chrominance artifact reduction module 140, and a color space conversion module 142. The controller 104 may implement the modules 132-142 in processing an input image 110. Some or all of the modules 132-142 depicted the computing device 102 may comprise software which the controller 104 may implement. In addition, or alternatively, some or all of the modules 132-142 may comprise one or more hardware devices that may be controlled by the controller 104.

Figure 2:
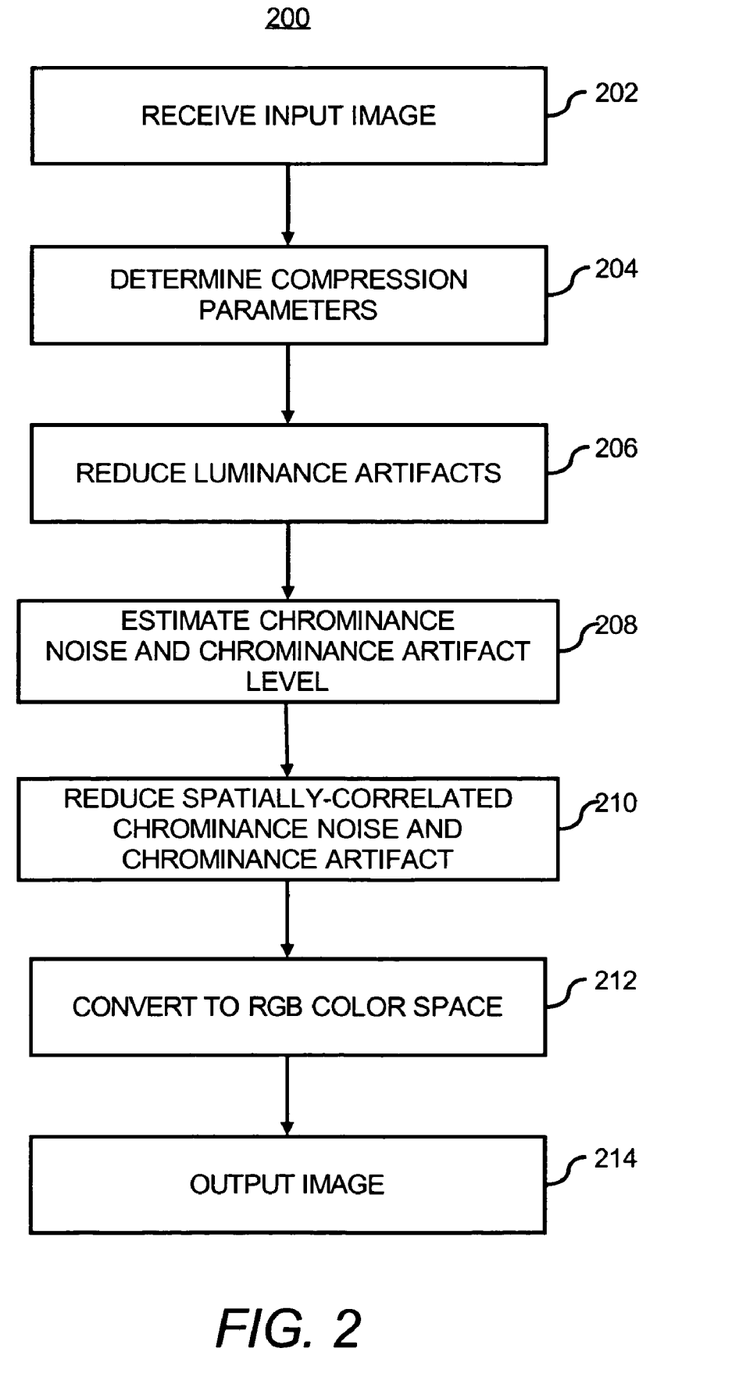
FIG. 2 shows a flow diagram of a method of processing an input image, according an embodiment of the invention.

In either respect, the various manners in which the controller 104 may implement the modules 132-142 are described in detail herein below with respect to FIGS. 2, 3A, and 3B. More particularly, FIG. 2 provides an overview of the enhancement techniques disclosed herein, which is generic to the flow diagrams depicted in FIGS. 3A and 3B. In addition, FIGS. 3A and 3B provide more detailed descriptions of the flow diagram depicted in FIG. 2, according to two examples.

Figure 3A:
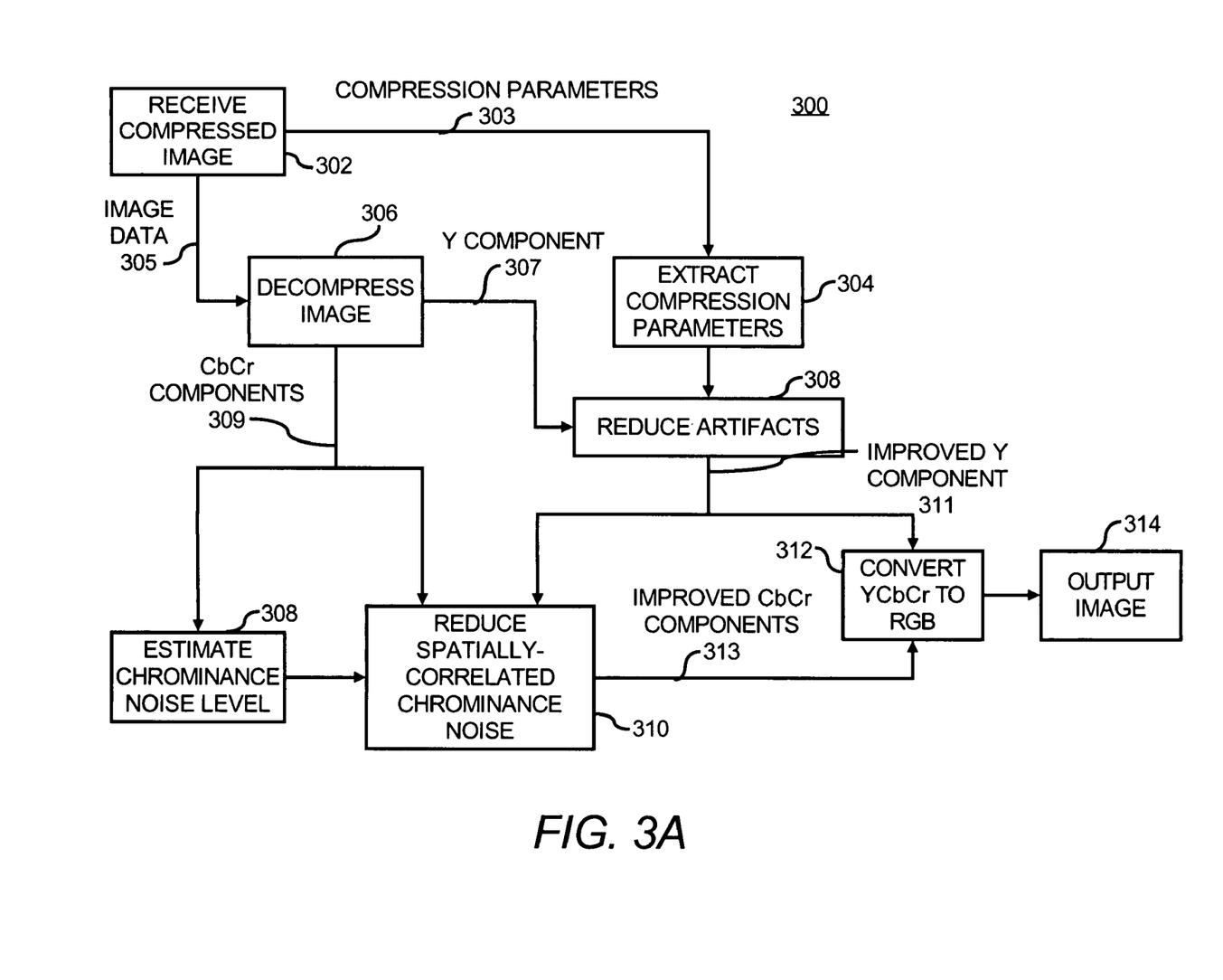
FIG. 3A shows a flow diagram of a method, which shows in greater detail the method depicted in FIG. 2 according to a first embodiment of the invention.
Figure 3B:
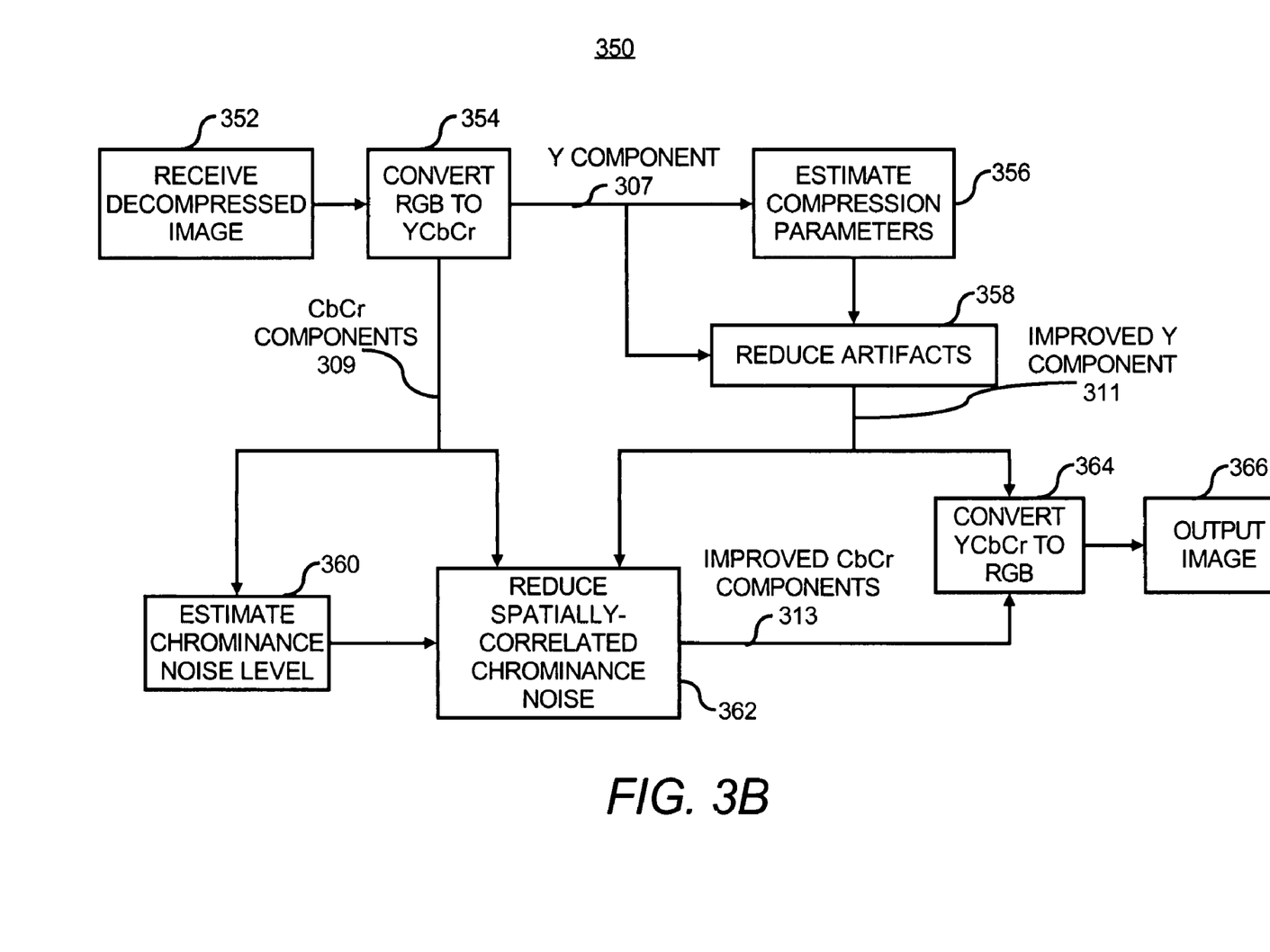
FIG. 3B shows a flow diagram of a method, which shows in greater detail the method depicted in FIG. 2 according to a second embodiment of the invention.

Generally speaking, FIGS. 2, 3A, and 3B show respective flow diagrams of methods 200, 300, and 350 of processing an input image, according to various examples. It is to be understood that the following descriptions of the methods 200, 300, 350 are a few manners of a variety of different manners in which an input image may be processed according to examples of the invention. It should also be apparent to those of ordinary skill in the art that the methods 200, 300, 350 represent generalized illustrations and that other steps may be added or existing steps may be removed, modified or rearranged without departing from the scopes of the methods 200, 300, 350.

With reference first to FIG. 2, there is shown a flow diagram of a method 200 of processing an input image 110, according to a first example. As shown, an input image 110 may be received at step 202. The input image 110 may comprise a compressed image or a decompressed image. As described below, the input image 110 may be processed in different manners depending upon whether the input image 110 comprises a compressed image or a decompressed image. A technique for processing a compressed input image 110 is described with respect to the flow diagram depicted in FIG. 3A and a technique for processing a decompressed input image 110 is described with respect to the flow diagram depicted in FIG. 3B. First, however, a description of method 200, which is generic to both of the flow diagrams depicted in FIGS. 3A and 3B, is provided.

Referring back to FIG. 2, the controller 104 may implement the compression parameter determination module 132 to determine the compression parameters of the input image 110, as indicated at step 204. Various manners in which the compression parameter determination module 132 may be implemented to determine the compression parameters are described in greater detail with respect to FIGS. 2A and 2B.

At step 206, the controller 104 may implement the luminance artifact reduction module 136 to reduce luminance artifacts contained in the input image 110 and obtain an improved luminance component of the input image 110. The controller 104 may use the compression parameters determined at step 204 to guide the luminance artifact reduction at step 206. The luminance artifacts and the chrominance artifacts may include artifacts caused by compression of the input image 110, such as, blocks, ringing, and the like.

In any regard, the luminance artifact reduction module 136 may be implemented to reduce the luminance artifacts at step 206 through use of any reasonably suitable known artifact reduction technique. An artifact reduction technique suitable for use by the luminance artifact reduction module 136 may be found in copending and commonly assigned U.S. Patent Publication No. 2005/0078872 (U.S. patent application Ser. No. 10/683,322), filed on Oct. 10, 2003, and entitled "Reducing Artifacts in Compressed Images", the disclosure of which is hereby incorporated by reference in its entirety.

The controller 104 may also implement the chrominance noise and chrominance artifact level estimation module 138 to estimate the chrominance noise and chrominance artifact level of the input image 110, as indicated at step 208. The chrominance noise and chrominance artifact level estimation module 138 may be implemented to estimate the chrominance noise and chrominance artifact level at step 208 through use of any reasonably suitable known chrominance noise and chrominance artifact level estimation technique. Examples of suitable noise level estimation techniques are disclosed in copending and commonly assigned U.S. patent application Ser. No. 11/388,152, entitled "A Method for Noise Estimation Based on Order Statistics of Local Variances", filed on Mar. 22, 2006, U.S. patent application Ser. No. 11/129,924, entitled, "Estimating Image Compression Quantization Parameter Values", filed on May 16, 2005, and U.S. Patent Publication Serial No. 2005/0244075 (U.S. patent application Ser. No. 10/835,969), entitled "System and Method for Estimating Image Noise", filed on Apr. 29, 2004, the disclosures of which are hereby incorporated by reference in their entireties.

At step 210, the controller 104 may implement the chrominance noise and chrominance artifact reduction module 140 to reduce the spatially-correlated chrominance noise and chrominance artifacts of the input image 110 and thereby obtain an improved chrominance component of the input image 110. The controller 104 may, for instance, use the improved luminance component of the input image 110 obtained at step 206 and the chrominance noise and chrominance artifact level estimated at step 208 to reduce the spatially-correlated chrominance noise and chrominance artifacts at step 210. By way of example, the chrominance noise and chrominance artifact reduction module 140 may employ a multi-resolution luminance-guided chrominance filtering technique to reduce the spatially-correlated chrominance noise and chrominance artifacts.

In other words, the chrominance noise and chrominance artifact reduction module 140 may be implemented to construct a multi-resolution image pyramid of the input image 110. The top level of the image pyramid may have the lowest spatial resolution and the lowest level of the image pyramid may have to highest spatial resolution. The levels of the image pyramid may be formed, for instance, through smoothing and downsampling to create the images with the lower resolutions as disclosed in copending and commonly assigned U.S. patent application Ser. No. 11/174,686, filed on Jul. 5, 2005, entitled "Multi-Resolution Processing of Digital Signals", the disclosure of which is hereby incorporated by reference in its entirety.

As disclosed in the Ser. No. 11/174,686 application, a feature-preserving noise filtering operation is performed on the top level and the difference between the original top level and the denoised top level is computed. This difference may be interpolated and subtracted from the next lower level, which has a relatively higher spatial resolution, to thereby remove the low-frequency (correlated) noise component at the next lower level with higher spatial resolution. A feature-preserving denoising operation is then performed on that level. This process may be repeated until the lowest level, which has the highest spatial resolution, is denoised.

Similarly to the disclosure contained in the Ser. No. 11/174,686 application, the controller 104 may implement the chrominance noise and chrominance artifact reduction module 140 to construct a multi-resolution image pyramid of the input image 110. However, the noise filtering operations performed at each of the levels may be performed through a luminance-guided chrominance filtering technique. In other words, the improved luminance terms obtained at step 206 may be exploited by the chrominance noise and chrominance artifact reduction module 140 to improve the chrominance level of the top level, which has the lowest spatial resolution. The chrominance noise and chrominance artifact reduction module 140 may implement any reasonably suitable known luminance-guided chrominance filtering technique. An example of a suitable filtering technique is disclosed in the article "Noise Removal From Chrominance Components of a Color Television Signal", by Arun N. Netravali, printed in IEEE Transactions on Communication, Vol. Com-26, NO. 8, August 1978, the disclosure of which is hereby incorporated by reference in its entirety.

As another example, the controller 104 may implement the chrominance noise and chrominance artifact reduction module 140 to reduce the spatially-correlated chrominance noise and chrominance artifacts through use of a bilateral filter. The bilateral filter is a non-linear filter introduced by Tomasi and Manduchi, which is used for selective denoising without blurring edges. The bilateral filter is based upon the idea of modifying weights of a convolution mask in an image dependent manner, based upon intensity differences between the pixel under consideration and its neighbors. In a conventional bilateral filter, the signal y(i) is filtered with the following formula:

$$y*(i) = \frac{1}{\sum_j g(y(i) - y(i-j)) \cdot h(j)} \sum_j y(i-j) \cdot g(y(i-j) - y(i)) \cdot h(j), \text{ where } h(\ ) \text{ is the}$$

Equation (1)

convolution kernel, y*( ) is the denoised output, i, j are pixel indices and g( ) is the photometric distance term used for selective denoising without blurring edges.

According to an example, the bilateral filter in Equation (1) may be modified such that the chrominance filtering may be more aggressive without blurring the image details. The chrominance noise and chrominance artifact reduction module 140 may use the improved luminance component as an additional input to obtain an improved chrominance component (Cb/Cr) at step 210. Thus, for instance, when denoising the chrominance component cb(i), the g(y(i)−y(i−j)) term in Equation (1) is replaced with $g_2(cb(i)-cb(i-j), y^*(i)-y^*(i-j), \lambda)$, as follows:

$$cb*(i) = \frac{1}{\sum_j g(cb(i-j)-cb(i), y*(i-j)-y*(i), \lambda)} \sum_j cb(i-j) \cdot g(cb(i-j)-cb(i), y*(i-j)-y*(i), \lambda) \cdot h(j),$$

Equation (2)

where $\lambda$ is the weighting between luminance guidance and chrominance guidance. In addition, a Gaussian function, such as, $g(x, y, \lambda, k) = \exp(k(x^2+\lambda y^2))$, where $k<0$, is an example of a suitable g function.

In either of the examples above, the chrominance noise and chrominance artifact reduction module 140 may be implemented to perform a luminance-guided chrominance filtering operation at the top level of the image pyramid to obtain an improved chrominance component. According to an example, for instance, the noise and artifact level for the top level of the image pyramid may optionally be estimated prior to multi-resolution luminance-guided chrominance filtering. In addition, a difference between the original chrominance component and the improved chrominance component for the top level may be computed. This difference may be interpolated and subtracted from the next lower level, which has a relatively higher spatial resolution, to thereby remove the correlated low-frequency noise component at that higher resolution level. A luminance-guided chrominance filtering operation is performed at that next level. The noise and artifact level may optionally be estimated for this level prior to performance of the luminance chrominance filtering operation for this level. In addition, the chrominance reduction and the optional noise and artifact estimation may repeat this process until the lowest level, which has the highest spatial resolution, is improved, to thereby obtain an improved chrominance component of the input image 110.

At step 212, the controller 104 may implement the color space conversion module 142 to convert the improved chrominance component and the improved luminance component into the Red-Green-Blue (RGB) color space. In one respect, the color space conversion module 142 may operate to combine the improved chrominance component and the improved luminance component in the RGB color space to produce the output image 112.

The controller 104 may output the output image 112, as indicated at step 214. As discussed above, the output image 112 may be outputted to at least one of an output device 114 and a network 116.

With reference now to the method 300 depicted in FIG. 3A, the method 200 depicted in FIG. 2 is shown in greater detail, according to a first example. In addition, the method 300 illustrates one manner in which the method 200 may be implemented when the input image 110 comprises a compressed image, such as a JPEG image. As such, a compressed input image 110 may be received at step 302.

The controller 104 may implement the compression parameter determination module 132 to extract compression parameters 303 from the compressed input image 110, as indicated at step 304. More particularly, for instance, the compression parameter determination module 132 may be implemented to extract the compression parameters 303 directly from the compressed input image 110, in any reasonably suitable known manner.

In addition, at step 306, the controller 104 may implement the image decompression module 134 to decompress the compressed input image 110. As shown, the controller 104 may implement the image decompression module 134 to separate data 305 pertaining to the compressed input image 110 into a luminance (Y) component 307 and chrominance (CbCr) or color components 309.

At step 308, the controller 104 may use the compression parameters extracted at step 304 and the luminance (Y) component 307 separated from the image data at step 306 as inputs to the luminance artifact reduction module 136 to thereby reduce luminance artifacts in the compressed input image 110. In addition, the controller 104 may reduce luminance artifacts in the compressed input image 110 as described above with respect to step 206 (FIG. 2) to obtain an improved luminance (Y) component 311.

The controller 104 may implement the chrominance noise and chrominance artifact level estimation module 138 to estimate the chrominance noise and chrominance artifact level of the compressed input image 110, using the chrominance components 309 extracted by the image decompression module 134, at step 308. The chrominance noise and chrominance artifact level estimation module 138 may operate as described above with respect to step 208 (FIG. 2). In addition, at step 310, the controller 104 may implement the chrominance noise and chrominance artifact reduction module 140 to perform the multi-resolution luminance-guided chrominance filtering to obtain improved chrominance components 313 in manners described above with respect to step 210 (FIG. 2).

At step 312, the controller 104 may implement the color space conversion module 142 to convert the improved chrominance component 313 and the improved luminance component 311 into the Red-Green-Blue (RGB) color space. In one respect, the color space conversion module 142 may operate to combine the improved chrominance component 313 and the improved luminance component 311 in the RGB color space to produce the output image 112. In addition, at step 314, the controller 104 may output the output image 112, through, for instance, at least one of an output device 114 and a network 116.

Turning now to the method 350 depicted in FIG. 3B, the method 200 depicted in FIG. 2 is shown in greater detail, according to a second example. In addition, the method 350 illustrates one manner in which the method 200 may be implemented when the input image 110 comprises a decompressed image. As such, a decompressed input image 110 may be received at step 352.

At step 354, the controller 104 may implement the color space conversion module 142 to convert the decompressed input image 110 from the RGB color space to the luminance-chrominance (YCbCr) color space. In addition, the controller 104 may implement the compression parameter determination module 132 to estimate compression parameters from the luminance (Y) component 307 of the decompressed input image 110 in any reasonably suitable manner. An example of a suitable compression estimation technique is disclosed in the article entitled "Characterizing and Estimating Block DCT Image Compression Quantization Parameters", authored by Ramin Samadani, and published in the Asilomar Conference on Signals, Systems, and Computers, 30 October 2 Nov. 2005, Pacific Grove, Calif., the disclosure of which is hereby incorporated by reference in its entirety.

The controller 104 may also implement the luminance artifact reduction module 136 to obtain an improved luminance (Y) component 311, at step 358. The controller 104 may implement the luminance artifact reduction module 136 to reduce luminance artifacts in the decompressed input image 110 in any reasonably suitable manner. An example of a suitable compression artifact reduction technique is disclosed in the article entitled "Deringing and Deblocking DCT Compression Artifacts with Efficient Shifted Transforms", authored by Ramin Samadani et al., and published in the IEEE International Conference on Image Processing, October 2004, Singapore.

The controller 104 may implement the chrominance noise and chrominance artifact level estimation module 138 to estimate the chrominance noise and chrominance artifact level of the decompressed input image 110, using the chrominance components 309 extracted by the color space conversion module 134, at step 360. The chrominance noise and chrominance artifact level estimation module 138 may operate as described above with respect to step 208 (FIG. 2). In addition, at step 362, the controller 104 may implement the chrominance noise and chrominance artifact reduction module 140 to perform the multi-resolution luminance-guided chrominance filtering to obtain improved chrominance components 313 in manners described above with respect to step 210 (FIG. 2).

At step 364, the controller 104 may implement the color space conversion module 142 to convert the improved chrominance component 313 and the improved luminance component 311 into the Red-Green-Blue (RGB) color space. In one respect, the color space conversion module 142 may operate to combine the improved chrominance component 313 and the improved luminance component 311 in the RGB color space to produce the output image 112. In addition, at step 314, the controller 104 may output the output image 112, through, for instance, at least one of an output device 114 and a network 116.

The operations set forth in the methods 200, 300, and 350 may be contained as a utility, program, or subprogram, in any desired computer accessible medium. In addition, the methods 200, 300, and 400 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 4:
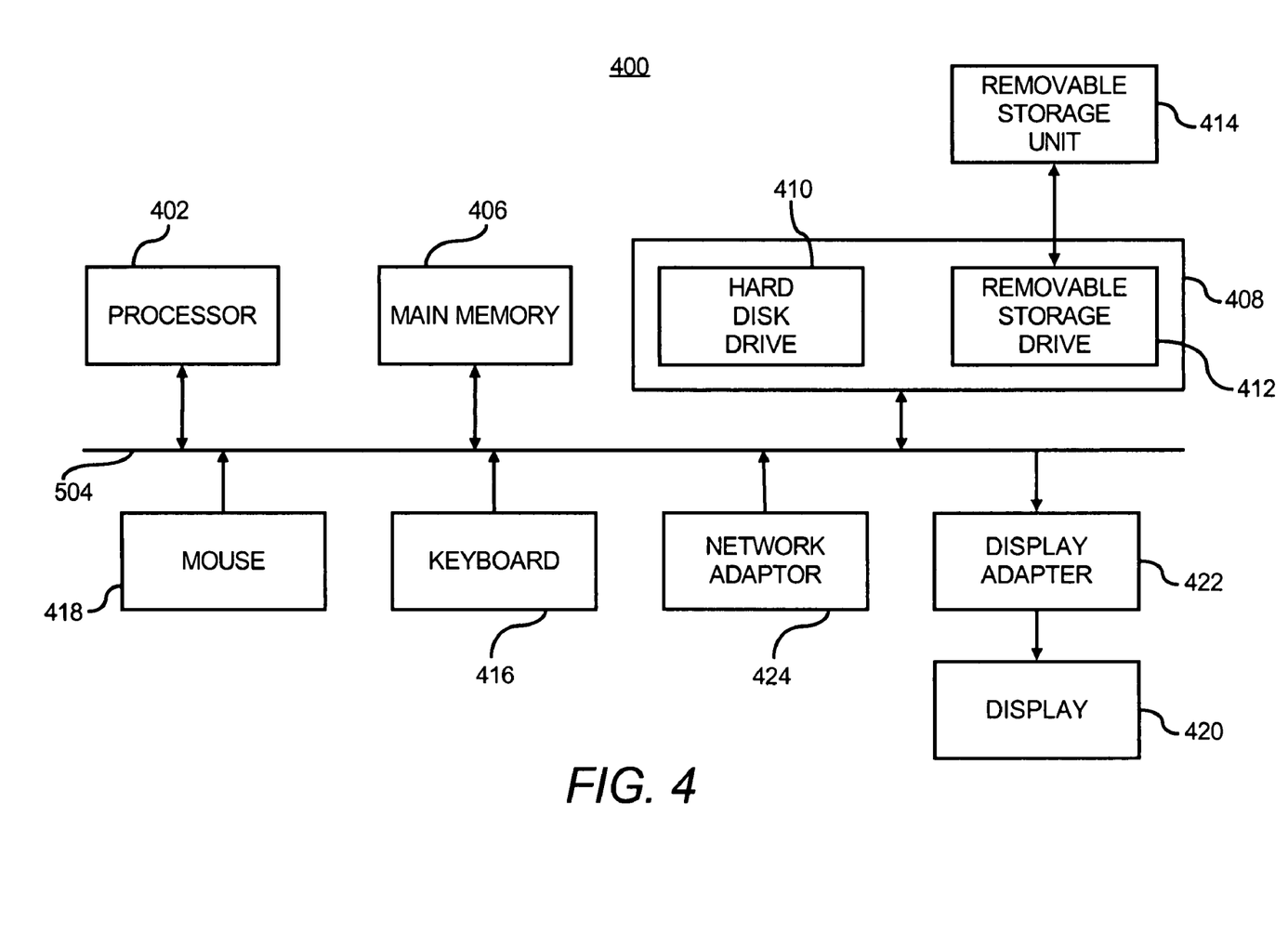
FIG. 4 illustrates a computer system, which may be employed to perform various functions described herein, according to an embodiment of the invention.

FIG. 4 illustrates a computer system 400, which may be employed to perform the various functions of the computing device 102 described herein above, according to an example. In this respect, the computer system 400 may be used as a platform for executing one or more of the functions described hereinabove with respect to the computing device 102.

The computer system 400 includes a processor 402, which may comprise the controller 104, and which may be used to execute some or all of the steps described in the methods 200, 300, and 350. Commands and data from the processor 402 are communicated over a communication bus 404, such as the bus 108. The computer system 400 also includes a main memory 406, such as a random access memory (RAM), where the program code for, for instance, the controller 104, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the processing of images may be stored.

The removable storage drive 410 reads from and/or writes to a removable storage unit 414 in a well-known manner. User input and output devices 106, 114 (FIG. 1) may include a keyboard 416, a mouse 418, and a display 420. A display adaptor 422 may interface with the communication bus 404 and the display 420 and may receive display data from the processor 402 and convert the display data into display commands for the display 420, which may be used to display the output image 112. In addition, the processor 402 may communicate over a network, for instance, the Internet, LAN, etc., through a network adaptor 424.

It will be apparent to one of ordinary skill in the art that other known electronic components may be added or substituted in the computer system 400.

In addition, the computer system 400 may include a system board or blade used in a rack in a data center, a conventional "white box" server or computing device, etc. Also, one or more of the components in FIG. 4 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method of processing an input image, said method comprising:
   determining compression parameters of the input image;
   reducing luminance artifacts in the input image to obtain an improved luminance component of the input image, wherein the determined compression parameters guide the luminance artifact reduction;
   estimating a chrominance noise and chrominance artifact level of the input image;
   reducing a spatially-correlated chrominance noise and chrominance artifacts of the input image with the improved luminance component, wherein the estimated chrominance noise and chrominance artifact level guide the spatially-correlated chrominance noise and chrominance artifact reduction to obtain an improved chrominance component of the input image; and
   outputting an output image having the improved luminance component and the improved chrominance component.

2. The method according to claim 1, further comprising:
converting the improved luminance component and the improved chrominance component to an RGB color space; and
wherein outputting the output image further comprises outputting the output image in the RGB color space.

3. The method according to claim 1, wherein reducing the spatially-correlated chrominance noise and chrominance artifacts further comprises constructing a multi-resolution image pyramid of the input image and applying multi-resolution luminance-guided chrominance filtering at each level of the image pyramid to obtain an improved chrominance component.

4. The method according to claim 3, further comprising computing a difference between the improved chrominance component and an inputted chrominance component at each level of the image pyramid, and interpolating and subtracting the difference from a next lower level of the image pyramid repeatedly to thereby obtain the improved chrominance component of the input image.

5. The method according to claim 1, wherein the input image comprises a compressed image, and wherein determining compression parameters of the input image further comprises extracting the compression parameters from the compressed input image.

6. The method according to claim 5, further comprising:
decompressing the compressed input image to obtain a luminance component and a chrominance component; and
wherein estimating a chrominance noise and chrominance artifact level further comprises estimating the chrominance noise and chrominance artifact level based upon the chrominance component.

7. The method according to claim 6, wherein reducing a spatially-correlated chrominance noise and chrominance artifacts further comprises reducing the spatially-correlated chrominance noise and chrominance artifacts based upon the chrominance component, the estimated chrominance noise and chrominance artifact level, and the improved luminance component.

8. The method according to claim 1, wherein the input image comprises a decompressed image, and wherein determining compression parameters of the input image further comprises estimating compression parameters from a luminance component of the decompressed input image.

9. The method according to claim 8, further comprising:
converting the decompressed input image from an RGB color space to a YCbCr color space having a luminance component and a chrominance component; and
wherein reducing luminance artifacts in the input image further comprises using the luminance component and the estimated compression parameters to obtain the improved luminance component.

10. The method according to claim 9, wherein estimating a chrominance noise and chrominance artifact level further comprises estimating the chrominance noise and chrominance artifact level based upon the chrominance component and wherein reducing a spatially-correlated chrominance noise and chrominance artifacts further comprises reducing the spatially-correlated chrominance noise and chrominance artifacts based upon the chrominance component, the estimated chrominance noise and chrominance artifact level, and the improved luminance component.

11. A system for processing an input image, said system comprising:
a compression parameter determination module;
a luminance artifact reduction module;
a chrominance noise and chrominance artifact level estimation module;
a chrominance noise and chrominance artifact reduction module;
a controller for implementing the compression parameter determination module to determine compression parameters of the input image, for implementing the luminance artifact reduction module to use the determined compression parameters to obtain an improved luminance component of the input image, for implementing the chrominance noise and chrominance artifact level estimation module to estimate a chrominance noise and chrominance artifact level of the input image, and for implementing the chrominance noise and chrominance artifact reduction module to use the improved luminance component and the estimated chrominance noise and chrominance artifact level to obtain an improved chrominance component of the input image; and
a device for outputting an output image having the improved luminance component and the improved chrominance component.

12. The system according to claim 11, further comprising:
a color space conversion module, wherein the controller is configured to implement the color space conversion module to convert the input image between a RGB color space and luminance-chrominance color space.

13. The system according to claim 11, wherein the controller is further configured to implement the chrominance noise and chrominance artifact reduction module to construct a multi-resolution image pyramid of the input image, apply multi-resolution luminance-guided chrominance filtering at each level of the image pyramid to obtain an improved chrominance component at each level, determine a difference between an inputted chrominance component and the improved chrominance component at each level, and repeatedly interpolate and subtract the difference from a next lower level of the image pyramid to thereby obtain the improved chrominance component of the input image.

14. The system according to claim 11, wherein the input image comprises a compressed image, and wherein the controller is configured to implement the compression parameter determination module to extract compression parameters from the compressed input image.

15. The system according to claim 14, further comprising:
an image decompression module, wherein the controller is configured to implement the image decompression module to decompress the compressed input image to obtain a luminance component and a chrominance component, and wherein the controller is further configured to implement the chrominance noise and chrominance artifact level estimation module to estimate the chrominance level of the decompressed input image based upon the chrominance component.

16. The system according to claim 15, wherein the controller is further configured to implement the chrominance noise and chrominance artifact reduction module to reduce the spatially-correlated chrominance noise and chrominance artifacts based upon the chrominance component, the estimated chrominance noise and chrominance artifact level, and the improved luminance component.

17. The system according to claim 11, wherein the input image comprises a decompressed image, and wherein the controller is further configured to implement the compression parameter determination module to estimate compression parameters from a luminance component of the decompressed input image.

18. The system according to claim 17, wherein the controller is further configured to implement the luminance artifact reduction module to use the luminance component and the estimated compression parameters to obtain the improved luminance component.

19. The system according to claim 18, wherein the controller is further configured to implement the chrominance noise and chrominance artifact reduction module to use the chrominance component, the estimated chrominance noise and chrominance artifact level, and the improved luminance component to obtain the improved chrominance component.

20. A non-transitory computer readable medium upon which is stored a computer program, said computer program implementing a method for processing an image when executed by a processor, said computer program comprising a set of instructions to:

determine compression parameters of the input image;

reduce luminance artifacts in the input image to obtain an improved luminance component of the input image, wherein the determined compression parameters guide the luminance artifact reduction;

estimate a chrominance noise and chrominance artifact level of the input image;

reduce a spatially-correlated chrominance noise and chrominance artifacts of the input image with the improved luminance component, wherein the estimated chrominance noise and chrominance artifact level guiding the spatially-correlated chrominance noise and chrominance artifact reduction to obtain an improved chrominance component of the input image; and output an output image having the improved luminance component and the improved chrominance component.

* * * * *